UNITED STATES PATENT OFFICE.

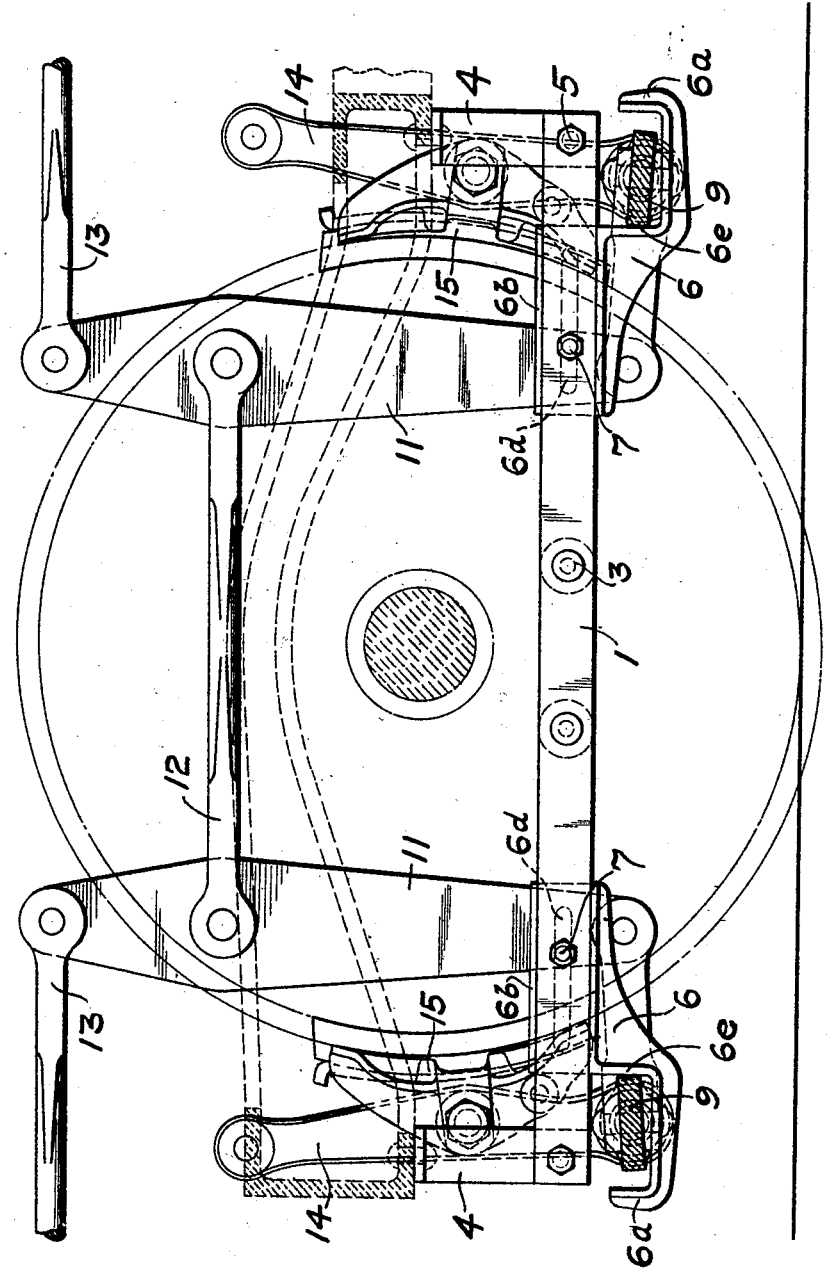

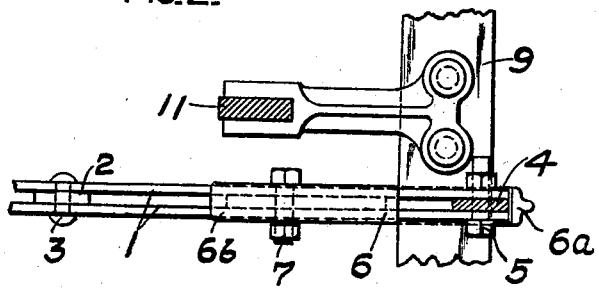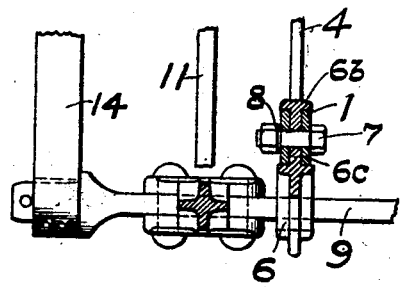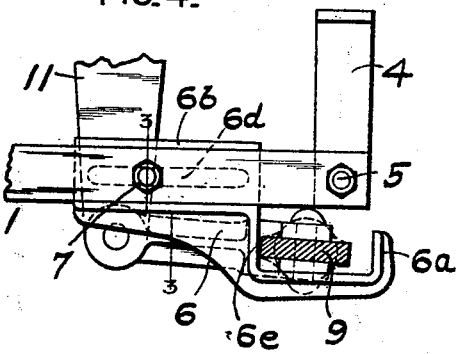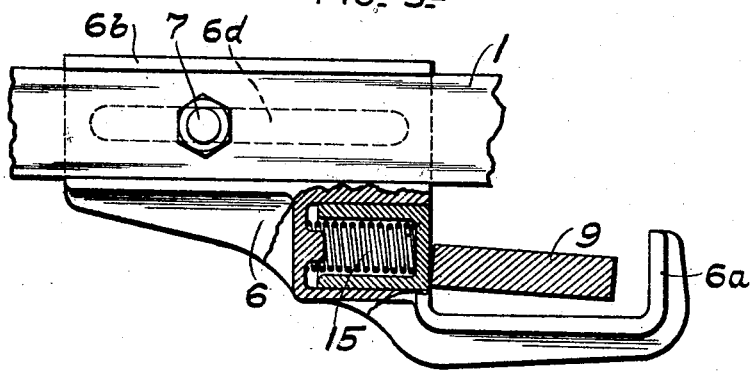

THOMAS L. BURTON, OF ST. LOUIS, MISSOURI, ASSIGNOR TO THE AMERICAN BRAKE COMPANY, OF ST. LOUIS, MISSOURI, A CORPORATION OF MISSOURI.

BRAKE-RIGGING RELEASE DEVICE.

1,319,043.  Specification of Letters Patent.  Patented Oct. 21, 1919.

Application filed April 10, 1917. Serial No. 160,908.

*To all whom it may concern:*

Be it known that I, THOMAS L. BURTON, a citizen of the United States, residing at St. Louis, in the State of Missouri, have invented a certain new and useful Improvement in Brake-Rigging Release Devices, of which improvement the following is a specification.

This invention relates to brake rigging for railway cars, and more particularly to means for controlling the clearance between the brake shoes and wheels when the brakes are released.

With certain types of brake rigging it has been customary to employ release springs for returning the system of truck levers, rods and brake beams to release position after the power brake has been released, and in such cases the springs have usually been connected with some member of the rigging and to the car body. Such springs will return certain portions of the rigging to release position, but usually all of the brake shoes are not moved far enough from the wheels to insure sufficient clearance between the same. This is due to the fact that the truck levers are free to move at both top and bottom in the releasing movement, and as the frictional resistance of each individual lever to turning on its pivotal connections is less than the frictional resistance of the lever system as a whole, the first set of truck levers and brake beams to be acted upon by said release springs will absorb nearly all of release clearance while other levers and brake beams farther along in the system are not moved far enough, and these brake shoes are left dragging upon the wheels.

It has also been the practice to use two release springs attached directly to each brake beam, but considerable difficulty has been experienced with these springs on account of the great difference in the amount of movement required of the brake beams with new brake shoes and unworn wheels as compared with worn shoes and wheels, this difference being sometimes as much as three inches. The result is that, in such cases, the tension of the brake beam release spring is so increased that practically all of the clearance is absorbed at points where there are thin shoes and worn wheels, leaving insufficient clearance at other brake beams where the shoes are thicker and the wheels larger. With the worn shoe and wheel, the considerable force necessary to pull the shoes against the wheels, on account of the additional deflection required of the release springs, results in an appreciable loss in braking effect, and in some instances the springs become broken on this account.

The principal object of my invention is to overcome these difficulties by controlling and distributing the release movement through the system of rods and levers so that clearance between the shoes and wheels will be substantially the same for all brake shoes, and it comprises means for limiting the release movement of the shoe or beam relatively to the wheel to an amount necessary to provide a substantial shoe clearance, whereby a release spring attached to the car body acts to move the first lever and beam the predetermined limited amount, and then acts, through the system, to force the others back a like distance, thus producing a uniform clearance for all the brake shoes. Another feature comprises means whereby the movement of the beams or shoes between application and release is made substantially constant regardless of shoe thickness and the size of wheels. With this construction the resistance of the release spring and its effect upon the brake rigging will be practically constant at all times.

Another feature comprises an improved safety hanger to prevent parts of the gear, such as the brake beams, from falling on the track in case of becoming disconnected or broken.

These and other features will now more fully appear from the following description of a preferred form of my improvement, and the novel features will be set forth in the claims.

In the accompanying drawings: Figure 1 is a longitudinal section taken between the truck wheels, and showing, in side elevation, a clasp type of brake rigging embodying my invention; Fig. 2, a horizontal section of a portion of the rigging taken just above the bracket and supporting bars; Fig. 3, an end elevation of the same with the bracket shown in transverse section on the line 3—3 of Fig. 4; Fig. 4, a side view of the same with the brake beam in section; and Fig. 5, a side elevation of a modified form of bracket with a portion indicated in section.

While my improvement is adapted to be used with any of the various forms of equalized systems of brake rigging, it is herein illustrated as applied in connection with a brake rigging of the clasp brake type, in which there are brake beams, 9, at both sides of each pair of wheels, with two sets of truck levers and rods, one at each side of the truck, the truck levers, 11, being pivotally connected at their lower ends to the respective brake beams, and connected by rods, 12, at their intermediate points with the levers of the same pair of wheels, and by rods, 13, at their upper ends, with the levers of an adjacent pair of wheels, except at the ends of the system where one end truck lever is connected to a pull rod connection from the brake cylinder, while the truck lever at the opposite end may be pivotally connected to the truck frame. The brake beams are suspended from the frame by hanger levers, 14, connected to the trunnions at the ends of the beams and the brake heads and shoes, 15, are mounted at an intermediate point on the hanger levers. This system constitutes one of the standard designs of clasp brake.

According to my improvement, means are provided for limiting the release movement of the brake shoes or beams, and, as shown in the drawings, this means comprises a bracket, 6, having a lug, $6^a$, serving as a stop for the brake beam, 9, the bracket being movably supported from the truck frame, as by means of a horizontal bar, 1, rigidly attached to the frame by vertical hangers, 4, at both ends. The bar, 1, is preferably formed in two parts spaced by separators, 2, and the hanger, 4, and fastened by rivets, 3, and bolts, 5. The bracket, 6, is slidably mounted on the bar, 1, by having a web portion, $6^c$, extending between said bars and provided with a T flange, $6^b$, at the top. There is also a flange on the bracket at the underside of the double bar, 1, and the web, $6^c$, is provided with a long slot, $6^d$, through which passes the bolt, 7. This bolt also extends through holes in the double supporting bars, 1, and is provided with a nut and spring washer, 8, for adjusting the amount of friction exerted to oppose the sliding movement of the bracket on said bars. By means of this particular construction, the slot, $6^d$, is not exposed, but is covered and protected by the side bars, 1. The bracket also has a wall, $6^e$, adapted to be engaged by the brake beam, 9, during the application movement, and extends beneath the brake beam to the lug, $6^a$, thereby also serving as an additional safety support for said beam in case of accidental breakage of the beam hangers.

The operation of the device is as follows: When the power brake is released, the usual brake release spring, (not shown), which is attached to the car body and a member of the brake rigging, acts to swing one of the truck levers, or the first pair of same, about the intermediate pivot until the lower end of said lever or levers and the brake beam have moved the predetermined limited amount, at which the beam engages the stop, $6^a$, of the bracket. The bracket has sufficient frictional resistance in its sliding bearing on the bars, 1, to prevent further release movement of this brake beam, and the truck lever then continues to turn about the stop, $6^a$, as a fulcrum, and the further release movement is distributed through the system, whereby each brake beam will be moved the desired amount and then in turn serve as a fulcrum for the lever to transmit the movement on to the next brake beam, and so on, until all of the shoes have been forced to release position and provide the proper amount of clearance.

The free movement of the brake beam between the stops, $6^a$ and $6^e$, of the bracket is sufficient for usual application movement to bring the brake shoes up against the wheels with full pressure, but as the shoes and wheels wear down, a greater movement is required, and under these conditions the brake beam engages the wall, $6^e$, of the bracket, and overcoming the friction of bolt, 7, slides the bracket along the supporting bars, 1, until the shoes are applied to the wheels. In this way the position of the bracket is automatically adjusted by the application movement of the system to compensate for the wear of the brake shoes and wheels, and the amount of the limited release movement of the brake beams to engage the stops, $6^a$, is maintained substantially constant under all conditions.

If desired, individual release springs for each brake beam, or each brake shoe, may also be employed in this connection, and in such a construction said individual springs, 15, are preferably mounted in recesses formed in said brackets, 6, as shown in Fig. 5, the springs being seated against the bottom of said recesses and provided with plunger caps for engaging the brake beam, 9. When a brake application is made, the first part of the movement of the brake beam operates to compress the spring, 15, up to the point where the brake beam comes into contact with the bracket, 6, at each side of the plunger cap, as indicated in Fig. 5, after which the bracket may be longitudinally adjusted upon its support, 1, during the further movement of the brake beam to its applied position, but there is no further compression of the spring, 15, at this time, and consequently a predetermined amount of spring compression is produced at each application, which amount is constant under all conditions and regardless of the wear of the brake shoes and wheels. Then when the brakes are released, each one of the springs, 15, expands and assists the movement of its individual beam through the limited free space and against the stop, $6^a$. A substantially uniform clearance is thus provided for all of the brake shoes.

Having now described my invention, what I claim as new and desire to secure by Letters Patent is:

1. In a brake rigging, the combination with brake shoes and a system of levers and rods for operating the same, of stops movably mounted relative to the truck frame, for limiting the release movement of the shoes, and means for automatically adjusting the position of said stops according to the wear.

2. In a brake rigging, the combination with brake shoes and a system of truck levers and rods for operating the same, of stops movably mounted relative to the truck frame, for limiting the release movement of the truck levers, and means operated by the application movement of said truck levers for adjusting the position of said stops according to the wear.

3. In a brake rigging, the combination with brake shoes and a system of truck levers and rods for operating the same, of stops for limiting the release movement of the truck levers, said stops being movably mounted on the truck frame and having frictional engagement therewith, and means for adjusting the position of said stops according to the wear.

4. In a brake rigging, the combination with brake beams, truck levers pivotally connected thereto, and rods for operating said levers, of movably mounted brackets provided with stops for limiting the release movement of the brake beams.

5. In a brake rigging, the combination with brake beams, truck levers pivotally connected thereto, and rods for operating said levers, of movably mounted brackets provided with stops for limiting the release movement of the brake beams, and means for adjusting the position of said brackets according to the wear.

6. In a brake rigging, the combination with brake beams, truck levers pivotally connected thereto, and rods for operating said levers, of movably mounted brackets provided with stops for limiting the release movement of the brake beams, said brackets having portions adapted to be engaged by the brake beams during the application movement to adjust the position of the said brackets according to the wear.

7. In a brake rigging, the combination with brake shoes and a system of truck levers and rods for operating the same, individual release springs for said truck levers, adjustable seats for said springs, and means operated by the application movement for adjusting the position of the spring seats according to the wear, whereby a uniform tension of said release springs is maintained.

8. In a brake rigging, the combination with brake beams, truck levers pivotally connected thereto, and rods for operating said levers, of movably mounted brackets provided with stops for limiting the release movement of the brake beams, and individual release springs mounted on said brackets and acting against the brake beams.

9. In a brake rigging, the combination with brake beams, truck levers pivotally connected thereto, and rods connecting said levers, of brackets supported from the truck frame and provided with stops for limiting the release movement of the beams, said brackets extending beneath said brake beams to serve as an emergency safety support therefor.

10. In a brake rigging, the combination with brake beams, truck levers pivotally connected thereto, and rods connecting said levers, of brackets supported from the truck frame and provided with stops for limiting the release movement of the beams, said brackets extending beneath said brake beams, and having portions adapted to be engaged by the beams during the application movement for adjusting the position of said brackets according to the wear.

11. In a brake rigging, the combination with brake beams, truck levers pivotally connected thereto, and rods connecting said levers, of double supporting bars suspended from the truck frame, a slidable bracket having a web extending between said bars and provided with a slot, and a bolt extending through said bars and slot for adjusting the frictional resistance, said bracket being provided with a stop for limiting the release movement of the brake beam.

In testimony whereof I have hereunto set my hand.

THOMAS L. BURTON.

Copies of this patent may be obtained for five cents each, by addressing the "Commissioner of Patents, Washington, D. C."